United States Patent [19]

Wood

[11] Patent Number: 5,426,706

[45] Date of Patent: * Jun. 20, 1995

[54] REMOTE SIMULTANEOUS INTERPRETATION SYSTEM

[76] Inventor: William H. Wood, 1621 Kalispell Ct., Sunnyvale, Calif. 94087

[*] Notice: The portion of the term of this patent subsequent to Aug. 3, 2010 has been disclaimed.

[21] Appl. No.: 99,956

[22] Filed: Jul. 30, 1993

Related U.S. Application Data

[63] Continuation-in-part of Ser. No. 676,815, Mar. 28, 1991, Pat. No. 5,233,663.

[51] Int. Cl.$^6$ ............................................. H04R 27/00
[52] U.S. Cl. ............................................. 381/85; 381/81; 379/391
[58] Field of Search ............... 379/391; 381/85, 82, 381/80, 81, 77

[56] References Cited

U.S. PATENT DOCUMENTS 3,720,788 3/1973 Hashimoto .
4,340,779 7/1982 Hashimoto et al. .
4,445,211 4/1984 Webber ............................ 379/206
4,941,187 7/1990 Slater .
5,233,663 8/1993 Wood ............................ 381/80

Primary Examiner—Curtis Kuntz
Assistant Examiner—Ping W. Lee
Attorney, Agent, or Firm—Wood, Herron & Evans

[57] ABSTRACT

A remote simultaneous interpretation system particularly suitable for oral communication between a doctor and patient who do not speak a common language includes a user station equipped with a first and second headsets and microphones, a remote simultaneous interpretation system also equipped with a headset and a microphone and an audio link operatively interconnecting the stations. The simultaneous interpreter station includes controls for routing incoming and outgoing signals from and to separate portions of the user station, thereby allowing the remotely located interpreter to listen to either the doctor, the patient or both and to route voiced interpreter signals to the doctor, the patient or both. The use of simultaneous interpretation reduces the language barrier between a doctor and a patient, thereby improving rapport and overcoming social and/or cultural barriers to providing medical care.

11 Claims, 10 Drawing Sheets

FIG. 7A

HEAR COM / CS AS — SEND MIC

QF TS CON \ CS AS | 00 | 01 | 11 | 10
--- | --- | --- | --- | ---
00 | 0 | 0 | 0 | 0
01 | 0 | 1 | 1 | 1
11 | 0 | 1 | 1 | 1
10 | 0 | 0 | 0 | 0

FIG. 7B

HEAR COM / CS AS — SEND NONE

HEAR COM / CS AS — SEND FLOOR

SELECT / CS AS — SEND MIC

SELECT / CS AS — SEND NONE

SELECT / CS AS — SEND FLOOR

QF TS \ CS AS | 00 | 01 | 11 | 10
--- | --- | --- | --- | ---
00 | 0 | 1 | 1 | 0
01 | 0 | 1 | 1 | 0
11 | 0 | 1 | 1 | 0
10 | 0 | 1 | 1 | 0

FIG. 7G
HEAR LANG — SEND MIC

| QF TS \ CS AS | 00 | 01 | 11 | 10 |
|---|---|---|---|---|
| 00 | 1 | 1 | 1 | 1 |
| 01 | 1 | 0 | 0 | 0 |
| 11 | 0 | 0 | 0 | 0 |
| 10 | 0 | 0 | 0 | 0 |

FIG. 7J
HEAR FLOOR — SEND MIC

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 1 | 0 | 0 | 0 |
| 10 | 1 | 1 | 1 | 1 |

FIG. 7H
HEAR LANG — SEND NONE

| QF TS \ CS AS | 00 | 01 | 11 | 10 |
|---|---|---|---|---|
| 00 | 1 | 1 | 1 | 1 |
| 01 | 1 | 0 | 0 | 1 |
| 11 | 0 | 0 | 0 | 0 |
| 10 | 0 | 0 | 0 | 0 |

FIG. 7K
HEAR FLOOR — SEND NONE

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 1 | 0 | 0 | 1 |
| 10 | 1 | 1 | 1 | 1 |

FIG. 7I
HEAR LANG — SEND FLOOR

| QF TS \ CS AS | 00 | 01 | 11 | 10 |
|---|---|---|---|---|
| 00 | 1 | 1 | 1 | 1 |
| 01 | 1 | 0 | 0 | 1 |
| 11 | 0 | 0 | 0 | 0 |
| 10 | 0 | 0 | 0 | 0 |

FIG. 7L
HEAR FLOOR — SEND FLOOR

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 1 | 0 | 0 | 1 |
| 10 | 1 | 1 | 1 | 1 |

FIG. 7M

HEAR SELF — SEND MIC

| QF TS \ CS AS | 00 | 01 | 11 | 10 |
|---|---|---|---|---|
| 00 | 0 | 0 | 0 | 0 |
| 01 | 0 | 1 | 1 | 1 |
| 11 | 0 | 1 | 1 | 1 |
| 10 | 0 | 0 | 0 | 0 |

FIG. 7N

HEAR SELF — SEND NONE

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7O

HEAR SELF — SEND FLOOR

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7P

HEAR FLR MIX — SEND MIC

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

FIG. 7Q

HEAR FLR MIX — SEND NONE

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

FIG. 7R

HEAR FLR MIX — SEND FLOOR

| QF TS \ CS AS | 00 | 01 | 11 | 10 |
|---|---|---|---|---|
| 00 | 1 | 1 | 1 | 1 |
| 01 | 1 | 0 | 0 | 1 |
| 11 | 0 | 0 | 0 | 0 |
| 10 | 0 | 0 | 0 | 0 |

FIG. 7S — SPEAK LANG / SEND MIC

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7T — SPEAK LANG / SEND NONE

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

FIG. 7U — SPEAK LANG / SEND FLOOR

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

FIG. 7V — LINE SIEZE / SEND MIC

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7W — LINE SIEZE / SEND NONE

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7X — LINE SIEZE / SEND FLOOR

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

REMOTE INTERPRETATION TRUTH TABLES

| INTERPRETER SPEAKS TO | DOCTOR (A) HEARS | | PATIENT (A) HEARS | | INTERPRETER (A) HEARS |
|---|---|---|---|---|---|
| | INTERPRETER | PATIENT (B) | INTERPRETER | DOCTOR (A) | SELF |
| DOCTOR (A) | YES | NO | NO | NO | NO |
| PATIENT (B) | NO | NO | YES | NO | NO |
| BOTH | YES | YES | YES | YES | YES |

FIG. 14

| INTERPRETER SPEAKS TO | DOCTOR (A) HEARS SELF (SIDE TONE) | PATIENT (A) HEARS SELF (SIDE TONE) |
|---|---|---|
| DOCTOR (A) (ONLY) | YES | NO |
| PATIENT (B) (ONLY) | NO | YES |
| BOTH | YES | YES |

FIG. 15

REMOTE SIMULTANEOUS INTERPRETATION SYSTEM

This application is a continuation-in-part application based on applicant's U.S. application Ser. No. 07/676,815, entitled "Simultaneous Interpretation System" filed on Mar. 28, 1991, and which will issue on Aug. 3, 1993 as U.S. Pat. No. 5,233,663.

FIELD OF THE INVENTION

This invention relates to a simultaneous interpretation system, and more particularly, to an improved simultaneous interpretation system which facilitates interpreter interaction with the system and other interpreters.

BACKGROUND OF THE INVENTION

The increasing number and diversity of people migrating to the United States, and in particular to California and specifically to the Bay Area, provides special challenges to community institutions. Since the majority of immigrants arrive without a working knowledge of English, schools, employers and health care institutions have a special responsibility to respond to the needs of these new arrivals. Notably in health care, the State of California has enacted legislation (SB1840) that requires all California hospitals, as of Jan. 1, 1991, to review their language services policy, to post notices of the availability of interpreters for languages represented by 5% or-more of the hospital's patient population and to provide translated versions of consent forms and other documents submitted to hospital patients.

When a patient and a physician do not share a common national language, the result can be a nightmare for the patient and a forbidding barrier to the provision of medical care by the physician. The problem begins with the crucial role of history-taking. The ability of the physician to explore the history of the present illness, past sickness episodes and possibly relevant family and social factors is a process that elevates human medical care above veterinary medicine. A misunderstanding during this initial procedure can seriously hinder the ability to provide the necessary care.

A common language is also required for a satisfactory physical diagnosis. The patient must response to the physician's request to open the eyes, to close them, to breath deeply or to stop breathing. The patient must understand so as to cooperate for a rectal or vaginal examination. Finally, the patient must be able to understand the formulation of the problem by the physician, the need for laboratory examination and for the details of a therapeutic program. Special problems are presented by labor and delivery, ambulatory surgery, and for the feasibility of psychiatric care.

Traditionally, patients who do not speak English often bring an anglophone relative or friend with them to communicate with the health care provider. This companion may have limited interpreter skills, may represent a source of embarrassment to the patient when intimate or delicate information must be solicited and/or may not be appropriately present in settings such as emergency or delivery rooms.

Hospitals have attempted to solve these problems in three ways. The first solution involves the assembly of a "language bank" of hospital employees with bi-lingual skills but with work assignments unrelated to interpreting. They are volunteers who are not paid for interpreting. Typically, the language bank staffer has had no training in interpreting. When asked to interpret, the employee must leave his or her work assignment to go and interpret in some other part of the hospital Many bi-lingual employees are immigrants at entry-level positions and their jobs may be threatened if they are called upon too frequently.

The second solution involves the employment of skilled interpreters as staff members. However, thus far, no standards have been developed to measure the quality of interpretation provided, and the performance of hospital interpreters varies from superb to marginal. The administration of language services is particularly difficult. Interpreters are summoned to various locations in the hospital and, when they arrive at the requested location, they may have to wait until provider and patient are brought together. The patient, often coming from a traditional and conservative culture, may find it unacceptable to communicate through an interpreter of the opposite sex. Further problems for the hospitals include the inefficiency of hiring staff for less-frequently encountered languages and for night and weekend coverage.

The third solution which addresses this problem is a service referred to as Language Line. On Oct. 31, 1990, American Telephone and Telegraph announced an international interpretation service available at $3.50 per minute, plus the cost of the call. Interpreters in 143 languages and dialects are on call. The program is generic and specific medical interpreters are not available. Ordinary telephone equipment is used and the interpretation is sequential, with one person speaking in to the equipment which is then handed to the other person to receive the interpretation. The service is thus expensive and does not generate the direct rapport between the two parties.

It is an objective of the invention to overcome, or to at least lower, the language barrier which interferes with necessary communications between a doctor and a patient who do not speak a common language.

It is another objective of the invention to increase the availability and effectiveness of interpretation services, particularly in a hospital environment, thereby to facilitate oral communication between two persons who do not speak a common language.

The present invention achieves the above-identified objectives by utilizing a remote interpretation station connected, either by hardwire or wireless, to doctor and patient headsets and microphones at a user station to enable a remotely located interpreter to simultaneously interpret the doctor's words to the patient in a language that the patient understands, and vice versa. This adaption of simultaneous interpretation to a one on one setting, between a doctor and a patient, with the interpreter remotely located, effectively eliminates the language barrier between the doctor and patient and thereby facilitates the diagnosing and providing of health care services.

According to a preferred embodiment of the invention, the remote simultaneous interpretation station includes a microphone and a speaker (or headset), and a doctor/patient unit, or station. At the remote simultaneous interpretation station, a three position switch determines signal routing to the headset and whether the interpreter listens to the DOCTOR, the PATIENT or BOTH. Similarly, the microphone includes three latched pushbuttons which bear the designations DOCTOR, PATIENT and BOTH. The depressed pushbutton determines outward signal routing of the interpreter's voiced signal. The doctor/patient station includes a "call" button to request simultaneous interpretation services.

In use, with an interpreter called and the doctor and patient ready to communicate, the interpreter positions the headset switch to BOTH and depresses the BOTH pushbutton for the microphone. Basically, this puts the system in a "conference" call mode, wherein sequential interpretations may occur because each of three parties hears all the other parties. At this time, the interpreter sequentially explains the procedures to both the doctor and the patient. In this mode, the interpreter hears his or her own voice. Due to familiarity with the system, it may eventually not be necessary to provide introductory instructions to the doctors.

After the introduction, one of the parties, usually the doctor, will begin speaking. The system routes the voiced signals of the doctor in a first language to the remotely located simultaneous interpretation station. The interpreter hears the signals if the headphone switch remains positioned at BOTH. The interpreter interprets the doctor's voiced signals into a second language which is understood by the patient. If desired, to reduce background noise, the interpreter may use the DOCTOR setting to listen to the doctor. With the PATIENT microphone pushbutton depressed, the system routes the interpreter's voiced signals to the patient.

When the doctor is finished speaking, the interpreter changes the position of the headphone switch to PATIENT (if it was on DOCTOR) or leaves the headphone switch on BOTH so that incoming voiced signals representing a response from the patient can be heard. The interpreter also depresses the DOCTOR pushbutton to route to the doctor a voiced interpretation of the patient's response. When the interpreter's microphone switch is set to either DOCTOR or PATIENT (via the pushbuttons), the interpreter does not hear his or her own voice. Thus, the BOTH designation serves as an immediate indication to the interpreter that a different pushbutton must be depressed, since neither the doctor nor the patient should hear the other's voice at full volume, nor should the interpreter hear his own voice during simultaneous interpretation.

If the interpreter chooses to listen to the doctor and the patient on solely the DOCTOR and PATIENT settings, respectively, without using the BOTH designation for listening, the three position headset switch and the pushbuttons may be ganged together so that switching of the headset switch to DOCTOR or PATIENT automatically actuates the microphone pushbuttons to select PATENT or DOCTOR, respectively.

If desired, to further simplify the job of the interpreter, the call button may be used by the doctor and patient to signal to the interpreter that the voiced signal has ended, and that a voiced response from the other party is now expected. Alternatively, the interpreter stations may include a camera so that he interpreter can make this determination simply by watching the doctor and patient.

Because interpretation is simultaneous, the doctor and the patient eventually become unaware of the language barrier between them. The system creates the impression that the doctor and patient are actually holding a direct conversation, without a third party listening. Applicant's studies show that, compared to sequential interpretation, use of simultaneous interpretation in a medical environment has increased the time spent during the initial history-taking portion of a doctor/patient examination. It is believed that his increase in time represents a greater rapport between the doctor and patient.

The present invention facilitates the use of simultaneous interpretation in the context of such doctor/patient oral communications, and thereby overcomes or significantly reduces the language barrier between the doctor and patient. The present invention also increases the availability and effectiveness of simultaneous interpretation.

Applicant's above-cited parent application, which is expressly incorporated by reference herein, in its entirety, discloses a simultaneous interpretation system which heightens the interpreter's awareness of the on/off status of his or her microphone, and which facilitates oral prompting between a pair of simultaneous interpreters working as a team in a booth. This previously disclosed system is particularly suitable for conferences involving multiple participation and multiple languages, with the participants located at a single site.

The present invention employs a substantial number of the features of the parent application, but it is more particularly suited to oral communication between two persons who do not speak or understand a common language. While the present invention is particularly suitable for patient doctor communications, particularly in a hospital, it is not limited to medical applications, or to two persons present in the same room. In fact, in addition to a remotely located interpreter (operatively connected by hardwire or wireless) the two persons wishing to communicate may also be separate and remote from each other with a wire or wireless audio connection therebetween.

These and other features of the invention will be more readily understood in view of the following detailed description and the drawings.

DETAILED DESCRIPTION OF THE INVENTION

FIGS. 7a–7X show logic charts used for programming each set of two PAL chips which control the logic for one interpreter interacting with the simultaneous interpretation system.

FIGS. 13 and 14 are schematic drawings which show control panels at the interpreter station and the user station, respectively, for the simultaneous interpretation systems depicted in FIGS. 8 and 9.

FIGS. 14 and 15 are truth tables which illustrate operation of a remote simultaneous interpretation system in accordance with this invention.

DETAILED DESCRIPTION OF THE DRAWINGS

An understanding of the present invention is predicated upon the concepts and structure disclosed in the parent application.

Figure 1:
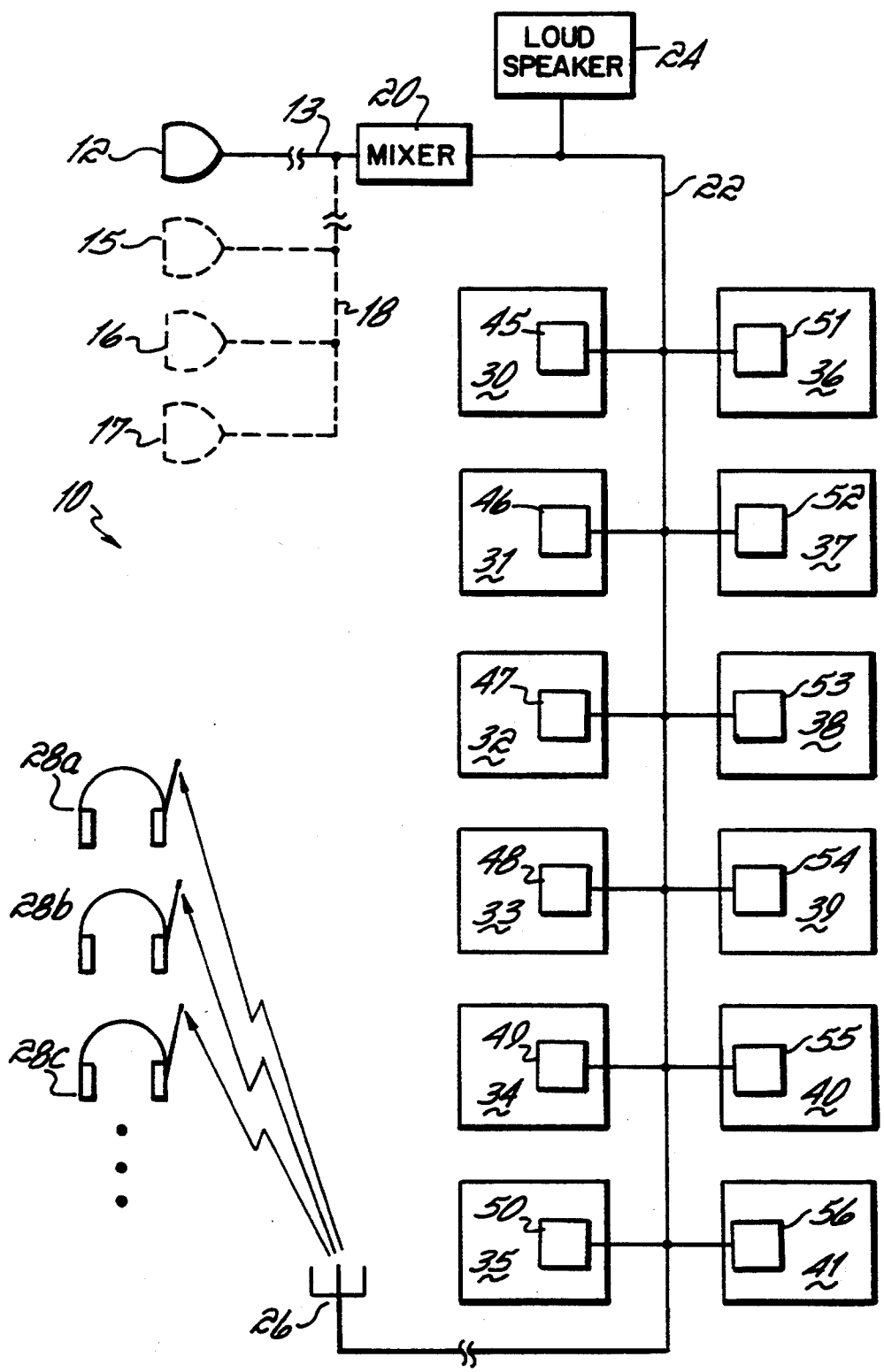
FIG. 1 is a schematic of a simultaneous interpretation system disclosed in the parent application.

FIG. 1 schematically shows a simultaneous interpretation system 10 of the parent application. The system 10 includes a microphone 12 into which a speaker speaks a source or floor language. The microphone 12 converts the audio signals of the source language into corresponding electrical signals which are conveyed along an electrical conductor 13. If bidirectional oral communication is to be implemented with this system 10, additional microphones 15, 16 and 17 will also be required. The outputs from microphones 15, 16 and 17 are fed to an electrical conductor 18, which along with conductor 13 terminates at mixer 20. The mixer ensured that electrical signals originating from only one of the microphones 12, 15, 16 or 17 are conveyed therebeyond to an electrical conductor designated FLOOR. The FLOOR conductor resides within a multiconductor cable or bus 22 which interconnects with the other electrical components of the system 10. If desired, a loudspeaker 24 may be connected to either the mixer 20 or the FLOOR line so that words spoken into one of the microphones may be heard over a loudspeaker 24 system.

The multi-conductor cable 22 operatively connects to an antenna 26 which transmits up to twelve frequency encoded radio signals to headsets 28a, 28a, 28c . . . etc. worn by listeners in the auditorium. Each of the up to twelve different frequency encoded channels usually corresponds to a different language. A listener wearing one of the headsets 28 simply selects the channel that he or she understands, and then adjusts the volume to a desirable level. It is most likely that microphone 12, loudspeaker 24 and the listeners wearing the headsets will be located in an auditorium. If communication is bidirectional, each of the participants will wear a headset, and the participants will be seated around a square or circular table, preferably with at least one of the microphones 12, 15, 16 or 17 accessible by each participant.

Acoustically isolated simultaneous interpretation booths 30-41 are located adjacent to the auditorium so that interpreters may view the floor microphones, but the booths 30-41 are preferably out of the line of sight between the listeners and the speaker. Each of the booths 30-41 includes a simultaneous interpretation station designated generally 45-56, respectively, which is interconnected to the multiconductor bus 22. Preferably, each booth includes a pair of simultaneous interpreters working as a team. Each station includes two sets of input and output controls, headsets, microphones and microphone switches.

In most cases, each team with be designated for interpretation into one particular language. Thus, an interpreter in a booth will listen to the source language from the FLOOR line, and then interpret another designated language into a microphone, which is then transmitted onto an output-selected LANGUAGE line. The signals on the output-selected LANGUAGE line are transmitted from the antenna 26 to the headsets 28a, 28a, 28c . . . etc., which have been tuned to the channel corresponding to that designated language. If one interpreter does not understand the source language on the FLOOR line, he or she may input select another LANGUAGE conductor from the bus 22 to hear the simultaneous interpretation from another interpreter in another booth who is translating the source language into a language that the first interpreter does understand. The first interpreter then reinterprets, or "relays" the message.

Figure 2:
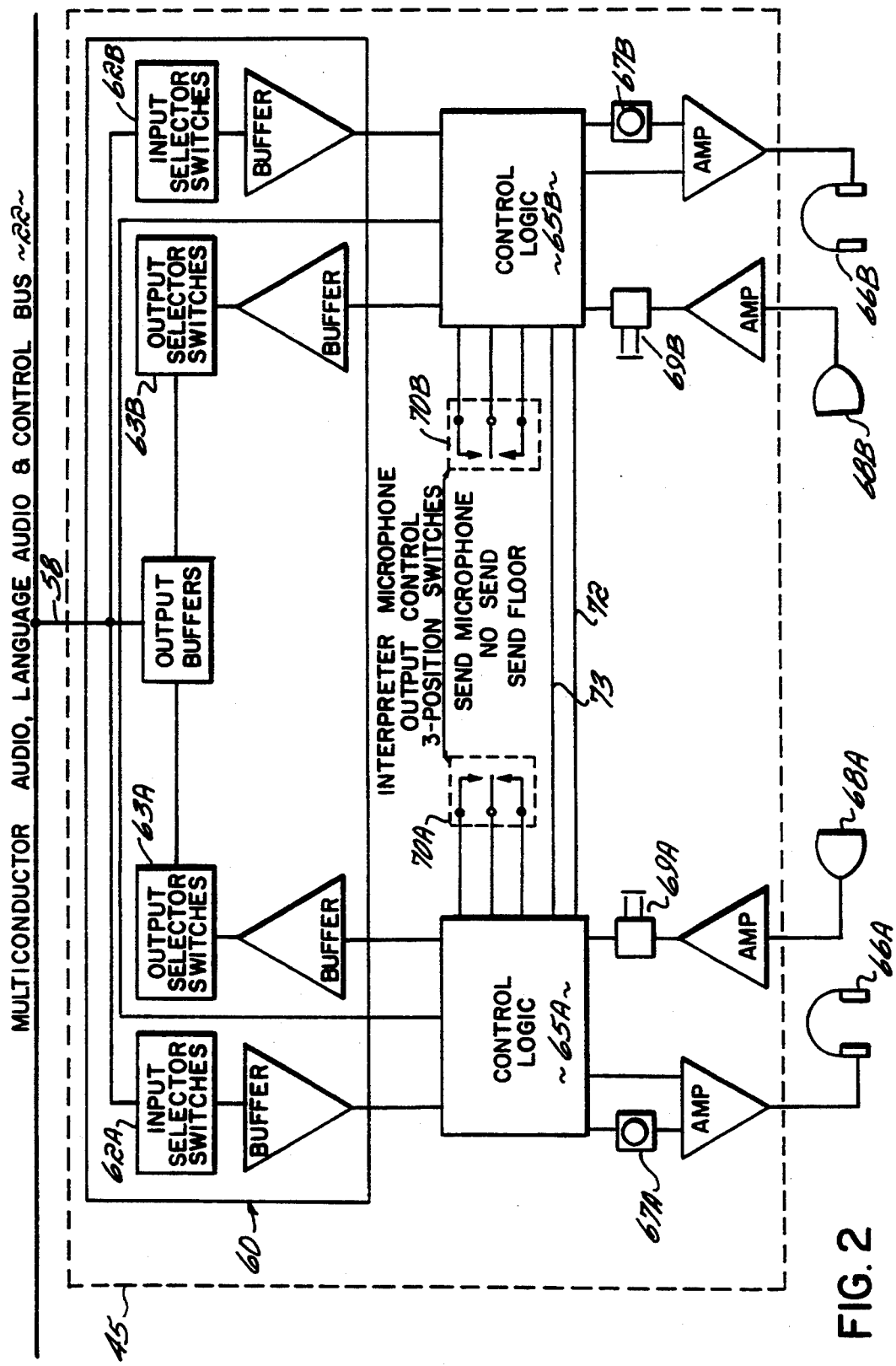
FIG. 2 is a schematic depicting a simultaneous interpretation station interconnected within the simultaneous interpretation system of FIG. 1.

FIG. 2 shows in somewhat more detail the specific components which make up each of the simultaneous interpretation stations. More specifically, FIG. 2 shows a simultaneous interpretation station 45 located in booth 30. Station 45 is identical to the other stations 46-56, except for one preferred embodiment which will be described later, in which station 51 is modified.

FIG. 2 shows a multi-conductor cable 58 connected to bus 22. Cable 58 interconnects bus 22 to the two sets of input and output controls for station 45, shown diagrammatically within block 60, and to the respective left and right controls for the two interpreters working as a team at simultaneous interpretation station 45. Thus, there are two sets of input selector switches, 62a and 62b, and output selector switches, 63a and 63b, for operating the left and the right sides of the station 45, respectively. Control logic for the left and right sides is shown diagrammatically in blocks 65a and 65b, respectively.

Preferably, each input selector switch, 62a or 62b, comprises a pushbutton and a rotary switch. In one position, the pushbutton input-selects the FLOOR line, and in the other position the pushbutton selects the LANGUAGE chosen on the twelve position rotary switch. A light may be used to indicate the status of the pushbutton. Each output-selector switch 63A or 63B, comprises two twelve position rotary switches which are then ganged together to facilitate flip-flop between two output-selected LANGUAGE lines. Similarly, each of the left and right sides include a headset, 66a or 66b, a volume control for the headset, 67a or 67b, a microphone, 68a or 68b, and a mute/cough button, 69a or 69b, which effectively short circuits the respective microphone. The left and right sides also have a three position microphone switch 70a or 70b. The three positions for the microphone switches, 70a and 70b, correspond to three modes of operation and are designated as SEND MICROPHONE, NO SEND, or SEND FLOOR. However, it is to be understood that other terms would be suitable.

When the microphone switches, 70A or 70B, are in the SEND MICROPHONE position, words spoken into the respective microphone, 68a or 68b, are conveyed to one of the twelve LANGUAGE lines selected on the respective output selector switches, 63A or 63B, by the interpreter. This is an "active" mode where the interpreter listens through the headset to either the source language on the FLOOR line or a relay language on another LANGUAGE line selected by input selector switches, 62A or 62B, and the interpreter interprets another language into the microphone, 68A or 68B, for transmission onto the output selected LANGUAGE line. In this "active" mode, the simultaneous interpreter does not hear any sidetone or audio feedback of his or her voice during interpretation, nor is the interpreter accustomed to hearing such sidetone during simultaneous interpretation.

In the other two positions for the microphone switches, 70A and 70B, corresponding to the NO SEND and SEND FLOOR positions, the respective microphone, 68A or 68B, is no longer in an "active" mode. Voiced or "local" input into the respective microphone, 68a or 68b is effectively disconnected from the output selector switches, 63a or 63b, and routed back to the headset, 66a or 66b, of the interpreter.

In its simplest form, this system 10 permits selective routing of local audio by a simultaneous interpreter back to his or hear headset when the microphone switch is not in an "active" mode. Thus, the simultaneous interpreter receives audio feedback of his or her voice to provide an immediate audible indication of whether or not the microphone is "active" or for all practical purposes, the on/off status of the microphone.

This system 10 can be implemented with a three position microphone switch, 70A or 70B, through which an interpreter selectively routes electrical signals from microphone, 68A or 68B, either to the bus 22 or to the respective headset, 68a or 68b.

Although in one sense this audible feedback simply provides an audio indication of what could be visually perceived by a simultaneous interpreter via an indicating lamp, it must be remembered that simultaneous interpreters work under intense pressure and time constraints with concentration focused mainly on the audio senses. Thus audible feedback of this nature serves as a reassurance of where the electrical signals corresponding to words spoken into the microphone, 68a or 68b, are being sent. If an interpreter hears local audio and knows that he or she should be interpreting at that time, he or she immediately knows to flip the switch, 70A or 70B, into the SEND MICROPHONE position. This feature also eliminates concern as to whether or not an indicating lamp is functioning properly.

Another aspect of the system 10 relates to the interaction between two simultaneous interpreters working as a team. To facilitate oral communication or "prompting" between the interpreters during "dead" time or when one interpreter reaches an impasse, this system 10 routes local audio along lines 72 and 73 between blocks 65A and 65B when both microphone switches 70A and 70B are not in a SEND MICROPHONE position. This enables the interpreters to leave the headsets 66a and 66b on their heads while communicating, so as to not miss the first few words if a speaker from the floor commences speaking. As soon as either one of the members of the team switches microphone switch, 70a or 70b into the SEND MICROPHONE position, this feature is disconnected.

In addition to the schematics shown in FIG. 2, simultaneous interpretation station 45 may include some additional diagnostics and/or volume controls. Such diagnostics would facilitate visual indication to a simultaneous interpreter which of the LANGUAGE lines has been selected by the input selector witch, 62a or 62b, and which of the output selector switches, 63a or 63b, have been selected. Additionally, a multi-colored lamp with three colors may be used to indicate the three different positions of the microphone switches 70a and 70b.

Although any one of a number of methods may be used to implement the features of this simultaneous interpretation system 10, the system 10 preferably utilizes the buffered outputs of programmed array logic (PAL) chips to drive field effect transistors (FET) switches for controlling routing of audio signals.

According to one variation of the system 10, one of the simultaneous interpreter stations, for instance station 51 located in booth 36, is modified to provide additional interacting capability with the other stations. This interaction may be used for control function, but is particularly useful in teaching simultaneous interpretation to students in the other booths 30-35 and 37-41. This modified station 51 is referred to as a TEACHER/CONTROL station. According to this variation, an instructor located at the TEACHER/CONTROL station 51 may override the audio transmitted from any of the other stations, regardless of the status, so that the instructor may speak with all of the student/interpreters or only those students who have output selected on switches, 63A or 63B, the same twelve designated LANGUAGE line that the instructor has selected on a rotary, twelve position LISTEN switch at TEACHER station 51.

To implement this variation of the system 10, the multi-conductor cable 22 carries at least 37 conductors. Fourteen of the conductors are audio lines which convey electrical signals corresponding to spoken words, with twelve designated as LANGUAGE lines, one designated FLOOR and another designated as CONTROL. The CONTROL line conveys the instructor audio to the student. Each of twelve conductors designated as STATUS lines are associated with one of the LANGUAGE lines. When a interpreter uses the output selection switch, 63A or 63B, to select a LANGUAGE line, a one milliamp signal occupies or seizes the STATUS line associated with the selected LANGUAGE line. Thus, the STATUS of line indicates whether or not the associated LANGUAGE line is occupied. If desired, by measuring the actual voltage on a STATUS line, the instructor may obtain an indication as to the number of interpreters who have output-selected via switch, 63a or 63b, a particular LANGUAGE line.

One conductor in cable 77 is referred to as TALK TO STUDENT and is operable via a two-position switch at the TEACHER/CONTROL station 51. Depression of this button SELECTS all of the interpreters who have seized the LANGUAGE line that the instructor has chosen on a rotary LISTEN switch in booth 36. Preferably, each station 45-50 and 52-56 has an indicating lamp that lights when the station has been SELECTED by depression of TALK TO STUDENT.

After depressing TALK TO STUDENT, the instructor may speak over the CONTROL line to the SELECTED students. The signal on the CONTROL line overrides the other audio lines so that the instructor is heard on the headsets. Depression of a two position ALL SELECT button by the instructor enables the instructor to speak over the CONTROL line to all of the interpreters, regardless of their output select position.

Five conductors in cable 22 serve as either power supply lines or as ground. One line supplies power to the FET switches located in each of the simultaneous interpretation stations 45-46 and in TEACHER/CONTROL station 51. Preferably this voltage is about +5 volts dc. Two supply lines carry positive and negative supply voltage for the logic circuitry housed within stations 45-56 and TEACHER/CONTROL station 51. These voltages are preferably about +12 volts and −12 volts. One of these last five lines serves as a ground for the audio lines, and one serves as a ground for the other components.

It should be noted that each of the audio lines is connected to ground by a 1K ohm loading resistor to allow conversion of the respective electrical signal to one audio signal.

The remaining four lines on cable 22 relate to instructor-operated controls at TEACHER/CONTROL station 51. Depression of a CHIME button by the instructor conveys a signal to the interpreters via the CHIME line. Under correct conditions, i.e., if a CHIME ENABLE signal is present at either the left or right control of a station, an audible signal is heard. The CHIME serves as an audible prompt from the instructor to the students. Preferably, the CHIME signal is also carried on an audio line.

A REMOTE STEP line supplies a clock signal in parallel to each of the simultaneous translation stations 45–50 and 51–56. Depending upon the status on a line referred to as REMOTE UP, the column either increases or decreases with each clock pulse on the REMOTE STEP line. The REMOTE UP is controlled by a three position spring loaded toggle switch at TEACHER/CONTROL station 51. For this button, the center position is off and the sides are designated "true" or "false". True corresponds to an increase in volume upon receipt of the clock signal, and false corresponds to a decrease in volume upon receipt of a clock signal. Finally, the REMOTE BURST line is controlled by a button which, when depressed, either halves the volume or doubles the volume depending upon whether or not the REMOTE UP switch is true or false.

Figure 3:
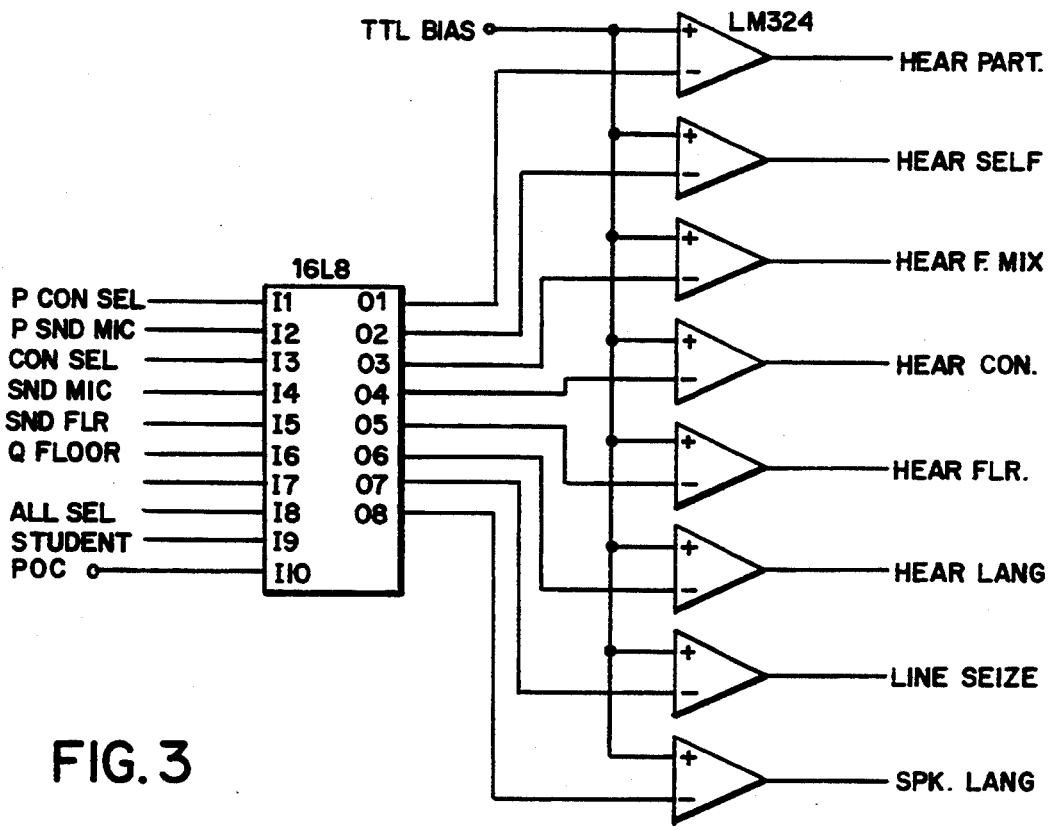
FIGS. 3 and 4 show inputs and outputs for two PALs which control the logic switching between one interpreter at a station and the system, for the system shown in FIG. 1. Because each station employs two interpreters, each station includes four of these chips.
Figure 4:
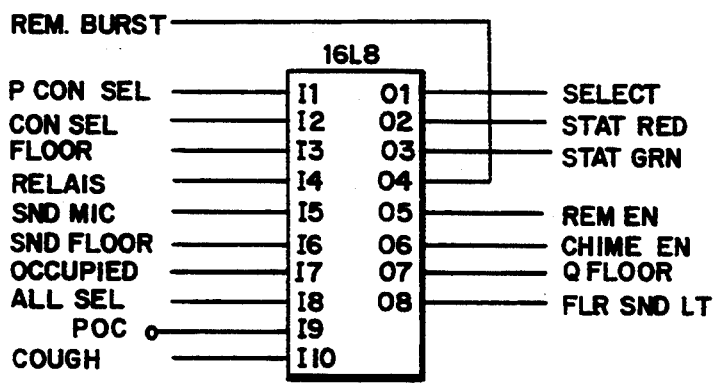

FIGS. 3 and 4 show the inputs and outputs to PALs 75 and 76, respectively. Both the left and the right side of each station 45–50 and 51–56 have two sets of PALs 75 and 76. As shown in FIG. 3, inputs 1 and 2 of PAL 75 connect to lines which indicate that state of the CONTROL line and the SEND MICROPHONE line which feeds the controls, 65A or 65B, of an interpreter's partner located in the same booth. Inputs 3 and 4 connect to lines which indicate the state of the CONTROL line and the SEND MICROPHONE line for that particular interpreter. Input 5 is connected to the SEND FLOOR line from the interpreter's microphone. Input 6 is connected to a Q FLOOR flip-flop at the interpreter's control, the output of which indicated whether the interpreter has selected FLOOR or another LANGUAGE line with input selector switch, 62a or 62b. Input 7 is not connected. Input 8 is connected to the ALL SELECT line. Input 9 is connected to the TALK TO STUDENT line. Input 10 is connected to a POWER ON/CLEAR line which clears the PAL 75 when the system 10 is turned on or when power is interrupted. It is to be understood that inputs from audio lines are buffered to the logic circuitry voltage.

Output 1 of PAL 75 actuates the HEAR PARTNER audio mode whereby an interpreter hears his or her partner. Output 2 drives the HEAR SELF audio mode in which an interpreter hears his or her local audio. Output 3 drives the HEAR FLOOR MIX in which the interpreter hears the FLOOR and a selected LANGUAGE line. Output 4 drives HEAR CONTROL mode for hearing audio from the instructor on the CONTROL line. Output 5 drives the HEAR FLOOR audio. Output 6 drives the HEAR LANGUAGE audio for that LANGUAGE line other than FLOOR which has been input-selected on input selector switch, 62a or 62b. Output 7 drives LINE SEIZE to occupy the STATUS line corresponding to whichever LANGUAGE line has been chosen on the output selector switch, 63a or 63B. Output 8 drives the SPEAK LANGUAGE mode for when the interpreter transmits onto a LANGUAGE line that has been selected on the output selector switch 63.

FIG. 4 shows PAL 76 and its interconnected inputs and outputs. Input 1 is connected to the CONTROL line of the interpreter's partner. Input 2 connects to the interpreter's CONTROL line. Input 3 connects to the FLOOR line. Input 4 is fed by an input referred to as RELAIS which indicated when a "relay" language is input selected, rather than the FLOOR line. Inputs 5 and 6 connect to SEND MICROPHONE and SEND FLOOR of the interpreter, respectively. Input 7 connects to an OCCUPIED line, the state of which indicates the condition on the line selected with output switch, 63a or 63B. Input 8 connects to ALL SELECT. Input 9 connects to POWER ON/CLEAR. Input 10 connects to the respective mute/call button, 69a or 69B. Again, some inputs may require a buffer to match the voltage of the logic circuitry.

The first output to PAL 76 drives SELECT indicator which indicates when the interpreter has been SELECTED by the instructor. Outputs 2 and 3 drive a status red indicator and a status green indicator, respectively, which indicate when an interpreter should be transmitting and when he should not be transmitting, respectively. Output 4 enables the REMOTE BURST line. Output 5 enables the REMOTE UP line. Output 6 enables the CHIME line. Output 7 drives a Q flip-flop referred to as QFLOOR, and output 8 drives a FLOOR SEND light.

Logic for REMOTE BURST and REMOTE UP must be separately decoded by the controls, 65A or 65B, at the station, so that the interpreter is not SELECTed when the clock pulse is high.

Figure 5:
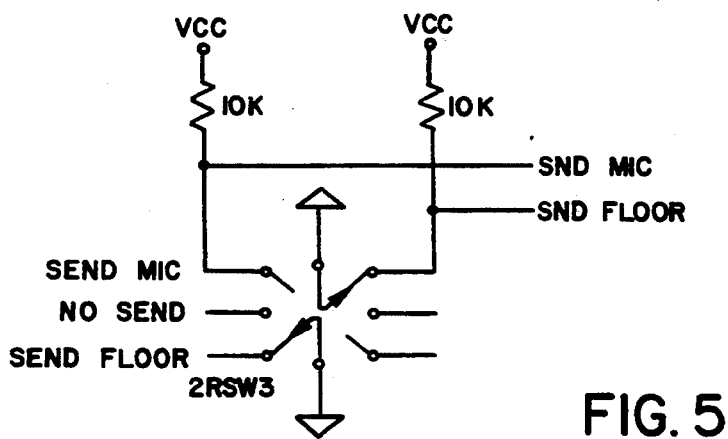
FIG. 5 depicts a three position microphone switch operable by an interpreter to select SEND MICROPHONE, SEND FLOOR or NO SEND for selectively routing voiced messages into the microphone.
Figure 6:
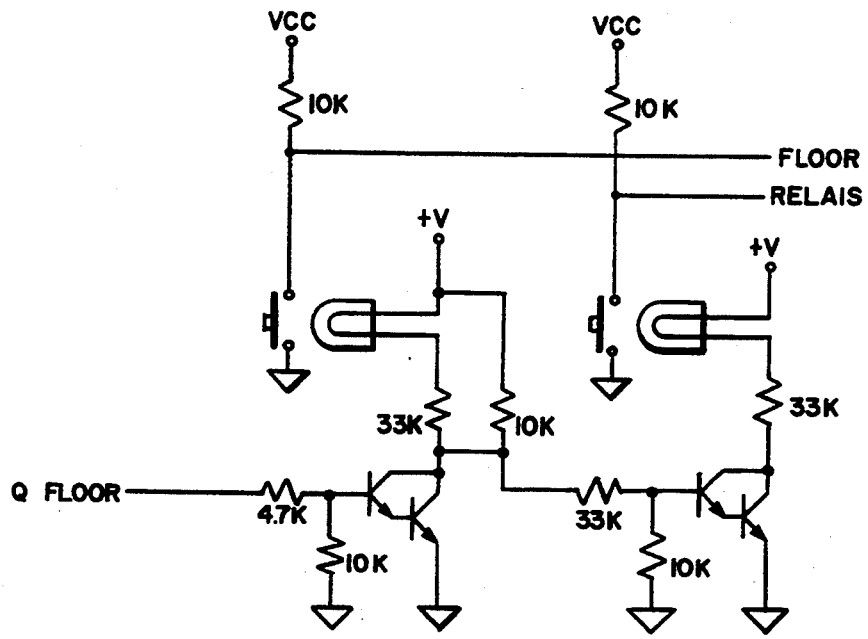
FIG. 6 depicts a portion of the input-select switch operable by an interpreter to receive signals from one of the audio lines designated FLOOR or LANGUAGE.

FIG. 5 shows the microphone switch and, FIG. 6 shows part of the input selector switch, 62A or 62B.

The inter-relationship among the following instructional commands and/or signals were used to derive the digital state charts 7A through 7X for programming both pairs of PALS 75 and 76 in each of the simultaneous interpreter stations 45–50 and 52–56.

The instructor listens to an interpreter speak when the instructor is listening to the LANGUAGE line selected by the interpreter, and the interpreter's microphone switch is in the MICROPHONE position. The instructor can speak to an interpreter whenever TALK TO STUDENT is activated and either ALL SELECT is active or the instructor is listening to the interpreter speak.

The language heard by the interpreter is controlled by the state bit QFloor. When QFloor is true, the FLOOR line is heard. When QFloor is false, the LANGUAGE line selected on switch 62 is heard (Relais high).

FIG. 6 shows normally open pushbutton switches Floor and Relais which control the state of the SP flip-flop QFloor. Pressing Floor makes QFloor true, pressing Relais makes QFloor false. To allow the interpreter to temporarily listen to the floor language, Floor overrides Relais. While both Floor and Relais are pressed, QFloor is true. When one switch is opened after both have been closed together the last switch closed will determine the state of the flip-flop.

When power is first turned on or after an interruption in power, QFloor will be set to the Floor state by the POWER ON/CLEAR signal.

The Floor Send Lamp in the microphone switch 70 will light when either the output selected LANGUAGE line is not occupied or the microphone switch 70 is in either SEND MIC or SEND NONE positions (i.e., this light is off only when the language is occupied and in Send Floor). Preferably a lamp connected to switch 70 has colored filters which control lamp color, with red for SEND MICROPHONE, yellow for SEND NONE and green for SEND FLOOR.

An interpreter station is SELECTED whenever all stations are selected (ALL SELECT) or the instructor is listening to the interpreter speak. SELECT enables the remote gain control of the interpreter microphone gain.

The condition SELECT/TALK TO STUDENT switches the interpreter headphone circuit from either Floor or Relais to the CONTROL line output. This allows an instructor to speak to, and supervise, either individual students by listening to the student interpreter speak, or to speak to all students by use of the ALL SELECT feature.

The interpreter's voice is sent to the LANGUAGE line selected by the output switch 63a or 63b whenever the microphone switch, 70a or 70b, is in the SEND MIC.

These signals control Speak A and Speak B lamps on the interpreter station front panel. The lamps indicate which, if either, of two speak LANGUAGE lines are being transmitted onto. The Speak A lamp lights only if SpeakLang is true and the A/B switch is in the A position. The Speak B switch operates in an analogous manner.

A language is occupied by the interpreter station by applying +1 mA to the appropriate STATUS or Language Occupied line whenever Line Seize is true. Line Seize is true when the MIC SWITCH is in either SEND MICROPHONE or NO SEND position (i.e., not in SEND FLOOR position). A language is occupied whenever any one or more of the interpreters selects that LANGUAGE line with the switch 63A or 63B while the microphone switch 70 is not in the SEND FLOOR position.

An interpreters hears the language selected be the input switch 62A or 62B whenever in Relais with the following exception. If the instructor presses TALK TO STUDENT while the instructor either selects all stations (ALL SELECT) or listens to the interpreter speak, then the interpreter will hear the CONTROL line only.

An interpreter hears the FLOOR line whenever input switch 62A or 62B is on in FLOOR with the following exception. If the instructor presses TALK TO STUDENT while the instructor either selects all stations (ALL SELECT) or listens to the interpreter speak, then the interpreter will hear the CONTROL line only.

The interpreter hears the Floor Mix when in Relais and the microphone switch is in the SEND FLOOR position with the following exception. The FLOOR MIX is not heard if the instructor selects TALK TO STUDENT and ALL SELECT.

An interpreter hears sidetone when either the microphone switch is not in the SEND MIC position of if the instructor presses TALK TO STUDENT and either all stations are selected (ALL SELECT) or the instructor is listening to the interpreter speak.

An interpreter hears his partner only when both partners microphone switches are not in the SEND MIC position and the instructor is not speaking to either the interpreter or partner (i.e., instructor either all stations are selected (ALL SELECT) or the instructor is listening to the interpreter speak.

An interpreter hears his partner only when both partners microphone switches are not in the SEND MIC position and the instructor is not speaking to either the interpreter or partner (i.e., instructor has not set TALK TO STUDENT while either or ALL SELECT or listening to either the interpreter or partner speak).

The interpreter hears the CONTROL line when the TALK TO STUDENT button is pressed and either all stations are selected or the instructor is listening to the interpreter speak.

The Chime sounds when an Attention button is pressed by the instructor and either all stations are selected (ALL SELECT) or the instructor is listening to the LANGUAGE line of either partner at the station (independent of MIC SWITCH position).

REMOTE STEP is the clock signal supplied in parallel to all of the remote gain control circuits. The remote gain is changed in only those circuits that have been selected by the Select signal.

REMOTE UP is the direction control signal supplied in parallel to all of the remote gain control circuits. REMOTE UP true increases gain, while REMOTE UP false decreases gain. The gain adjustment cannot go past either maximum or minimum (no overflow/underflow) and is changed by one step for each cycle of REMOTE STEP while the circuit is enabled by the SELECT signal.

The TALK TO STUDENT signal allows the instructor's microphone signal to be transmitted to the selected interpreter or interpreters (either an individual or a team on a particular LANGUAGE line each with the microphone switch in SEND MIC position, or ALL SELECT to speak to all interpreters).

ALL SELECT controls global access to remote gain adjustment (for gain normalization for instance), attention signal (via chime), and permits the instructor to speak to all student interpreters at once (class dismissed). In each of these three cases another signal is required to initiate the action. These other signals are respectively REMOTE STEP (remote gain switch or gain normalize switch), Chime audio (Attention button), and Student (TALK TO STUDENT switch).

These parameters were used to generate state maps shown in FIGS. 7A through 7Z. These Figures show the high or low output of HEAR CONTROL, SELECT, HEAR LANGUAGE, HEAR FLOOR, HEAR SELF, HEAR FLOOR MIX, SPEAK LANGUAGE and LINE SEIZE in the three different microphone positions SEND MICROPHONE, NO SEND and SEND FLOOR, and under all permutations of the states of the QFloor flip-flop (QF), the TALK TO STUDENT (TS), CONTROL line (CS) and ALL SELECT (AS).

Unlike the other station, the CONTROL/TEACHER station 51 only requires one microphone headset and set of controls. To program the PALs located in CONTROL/TEACHER booth 36, the microphone switch varies in that SEND MICROPHONE sends the signal onto the CONTROL line. Thus, no output selected switch is needed. For input, the instructor needs only one twelve position rotary switch for selecting a LANGUAGE Line.

According to the present invention, simultaneous interpretation may be used in one on one, person to person conversations to eliminate, or to substantially reduce, the language barrier between two people who do not speak a common language.

One field in which simultaneous interpretation can provide readily perceived benefits is medicine, and particularly doctor/patient communications.

To implement simultaneous interpretation in one on one, person to person conversations, it is preferable that the simultaneous interpreter be located remotely from the two persons who wish to communicate. While this is also true with respect to the system 10 previously described, it is somewhat less of a factor, due to the multiplicity of listeners and the relatively limited number of speakers at a conference. With the system 10, the objective is to make listeners feel as if they are spoken to in their own language.

With the present invention, the objective is to involve a person as a participant, not just a listener, in a direct person to person communication with the aid of simultaneous interpretation. The system 10 shown in FIGS. 1-7X need only be modified somewhat to realize the objectives of the present invention. For the simplest and most common implementation of this invention, only one of the stations 45-56 is needed, along with one set of controls and two of the microphones 12, 15, 16 and 17 and two of the headsets equipped with acoustical speakers 28a, 28a 28c ... etc. Basically, the invention requires a first of the microphones paired up with a first of the headsets (in the application, "headset" and "acoustical speaker" are used interchangeably), a second of the microphones paired with a second of the headsets, only one booth with one set of controls, the FLOOR line, one LANGUAGE line, and input (headset) and output (microphone) selection switches to selectively control what the simultaneous interpreter hears and transmits, respectively. These selector switches are in effect, modifications of input selector switches 62A and 62B and output selector switches 63A and 63B, respectively, shown in FIG. 2, and to some extent the switches 69A and 69B.

Figure 8:
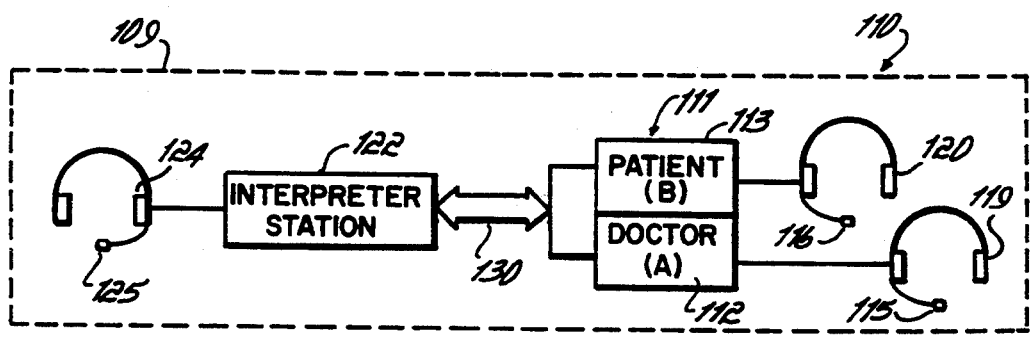
FIGS. 8–11 are schematic drawings which show four variations of a remote simultaneous interpretation system in accordance with the present invention.

FIG. 8 shows a remote simultaneous interpretation 110 in accordance with the present invention. In FIG. 8, the remote simultaneous interpretation system 110 is located entirely within a single facility 109, such as a hospital. The system 110 includes at least one user station 111 which includes a first, or doctor portion 112 and a second, or patient portion 113. Doctor portion 112 includes a first microphone 115 and a first headset 119. Second portion 113 includes a second microphone 116 and a second headset 120.

The remote simultaneous interpretation 110 further includes a simultaneous interpretation station 122 which is located remotely from the user station 111. The simultaneous interpretation station 122 includes a headset 124 and a microphone 125. The user station 111 and the interpretation station 122 are operatively interconnected to convey audio signals therebetween. In FIG. 8, a full duplex wire link 130 provides audio interconnection between user station 111 and interpretation station 122. This link 130 may be either a dedicated network, or it may form part of one of the conventional public telephone networks.

It is to be understood that, while a single user station 111 is shown in FIG. 8, the present invention further contemplates the use of additional user stations, if desired.

For the system 110 shown in FIG. 8, a doctor uses headset 119 and microphone 115, and a patient uses headset 120 and microphone 116 to communicate directly with each other, in a one on one manner, via a remotely located simultaneous interpreter at the simultaneous interpretation station 122. When the doctor speaks into microphone 115 in a first language, the interpreter at interpretation station 122 hears the first language and interprets into a second language understood by the patient. The second language is conveyed from the interpretation station 122 to the headset 120 so that the patient hears the interpreter's voiced audio signals almost simultaneously with the first voiced audio signals spoken by the doctor. During this mode of operation, the interpreter's headset 124 is set to BOTH or PATIENT, and the microphone 125 is set to PATIENT.

Conversely, when the patient speaks in a second language into microphone 116, the interpreter hears the second language at the simultaneous interpretation station 122 and interprets into the first language which is understood by the doctor. Voiced signals from the interpreter spoken at the simultaneous interpretation station 122 are then conveyed to headset 119 in a nearly simultaneous manner. During this mode of operation, the interpreter's headset 124 is set to BOTH or PATIENT, and the interpreter's microphone 125 is set to DOCTOR.

Thus, the simultaneous interpreter at the simultaneous interpretation station 122 controls routing of his or her incoming signals and routing of outgoing interpreted signals, thereby to assure that the signals are conveyed to the correct party. The simultaneous interpreter hears in one language and interprets into another language, while the doctor and the patient each speak and listen in a single language. If the interpreter hears his or her own voice during simultaneous interpretation, the setting for the microphone 125 is incorrect. If desired, the system 110 can be configured so that, during interpreting, the doctor's voice and the patient's voice are conveyed to the patient and the doctor, respectively, but at a lower volume, to make the illusion of simultaneous conversation more realistic for the doctor and patient.

Figure 9:
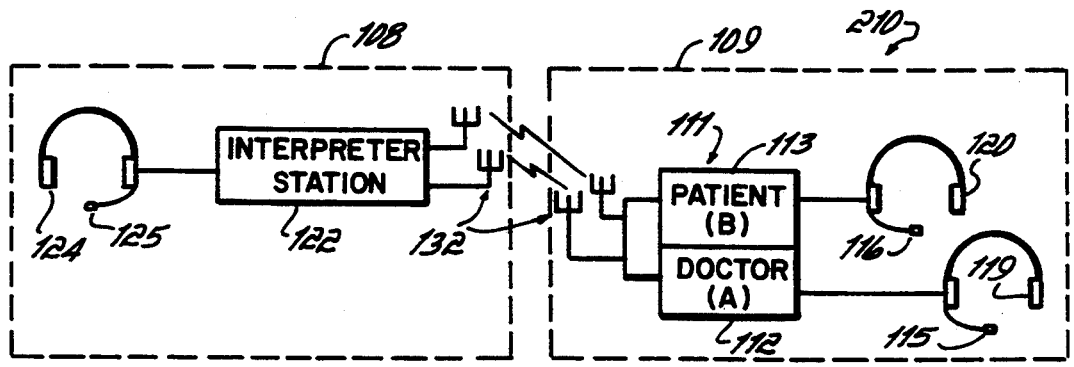

While FIG. 8 shows a full duplex wire link 130 interconnecting the simultaneous interpretation station 122 and the user station 111, either as a dedicated line or as a telephone line of a telephone system, the present invention also contemplates the use of one or more additional ways of establishing an audio link therebetween. For instance, the link may be accomplished via radio signalling, infrared signalling, optical fibers or combinations thereof. FIG. 9 further illustrates this point, a second variation of the remote simultaneous system 210 in accordance with the present invention.

In FIG. 9, the user station 111 is located at hospital 109, but simultaneous interpretation station 122 is located in a separate facility 108. The facility 108 could be a facility dedicated to the needs and services of a plurality of simultaneous interpreters capable of interpreting in various, needed languages, or any other type of facility that a simultaneous interpreter can be reached via an audio signal. Thus, the facility 108 could actually represent the home or office of any simultaneous interpreter who is ready and available for simultaneous interpretation.

Because facility 108 and hospital 109 are located remotely from each other, the stations 111 and 122 utilize antennae 132 to establish a full duplex wireless link therebetween. As indicated above, this wireless link could utilize radio signals or infrared signals.

Figure 10:
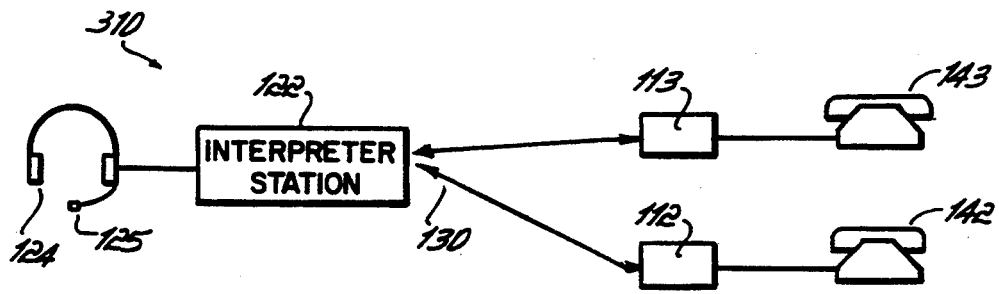

FIG. 10 illustrates a third variation of a remote simultaneous interpretation system 310 in accordance with the present invention. In this variation, two persons who wish to communicate are located remotely from each other. This may occur, for instance, if a doctor and a patient wish to confer by telephone prior to a face to face meeting. This variation of the invention incorporates use of a private telephone network or one of the public telephone networks as an audio link between interpreter station 122 and user station 111. Instead of a headset and a microphone, each of first portion 112 and second portion 113 includes a conventional telephone, 142 and 143, respectively. In this variation, the simultaneous interpretation station 122 must simultaneously interconnect with two telephone lines to allow the simultaneous interpreter to listen to one person while speaking to the other.

Figure 11:
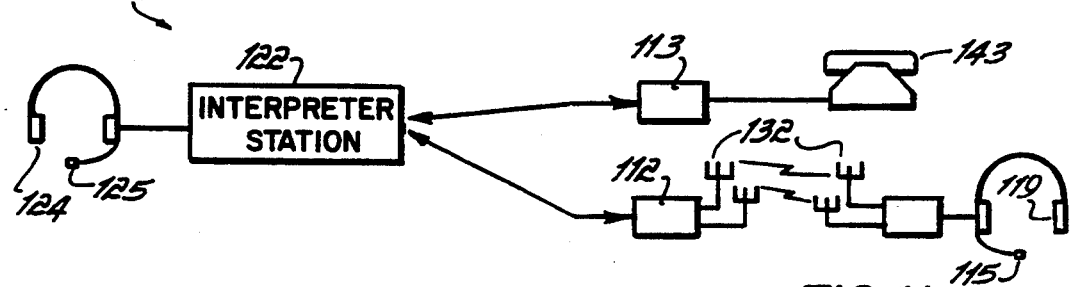

FIG. 11 shows a fourth variation of a remote simultaneous interpretation system 410 in accordance with the present invention. More particularly, FIG. 11 shows a remote simultaneous interpretation system 110 wherein the doctor and the patient are remote from each other and the remote interpreter, and the doctor portion 112 includes two remote sections 112a and 112b which utilize antennae 132 to operatively interconnect with the rest of the system 110 via wireless communication, as for instance a cellular telephone network.

FIG. 10 and 11 illustrate the applicability of remote simultaneous interpretation, in accordance with the invention, to situations where the two participants are also remote from each other. Because of this versatility, the present inventions increases the availability of simultaneous interpretation to persons who need an interpreter in order to communicate. Additionally, the present invention also accommodates the needs of simultaneous interpreters by making their services accessible to those in need while not restricting or requiring their presence at one or more prescribed locations or facilities.

Figure 12:
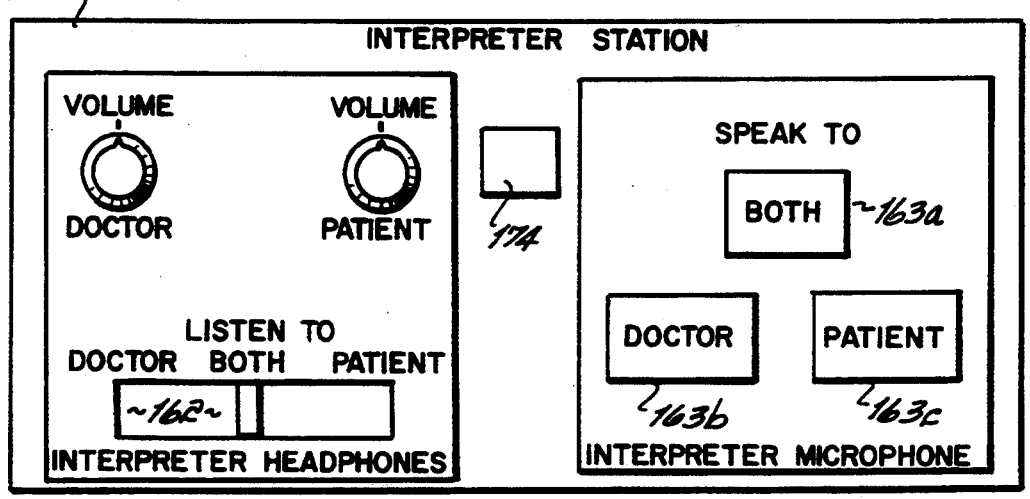

FIG. 12 shows a preferred embodiment of a control panel 160 located at the simultaneous interpreter station 122. More particularly, FIG. 12 shows a three position switch 162 designated "LISTEN TO", with the three positions designated DOCTOR, BOTH and PATIENT. The position of switch 162 determines whether the simultaneous interpreter listens to voiced signals spoken into first microphone 115, second microphone 116 or both. A volume control knob 164 controls the volume from microphone 115, and a volume control knob 165 controls the volume from microphone 116.

The panel 160 further includes three pushbuttons 163a, 163b and 163c, designated BOTH, DOCTOR and PATIENT, respectively. Depression of one of these three pushbuttons determines routing of the voiced signals spoken by the interpreter into the microphone 125 at interpreter station 122. Preferably, these pushbuttons are illuminated momentary pushbuttons with a lockout feature, so that depression of one button automatically locks out the other two. Pushbutton 163a conveys audio signals from microphone 125 to both first headset 119 and second headset 120. Pushbuttons 163b and 163c interconnect microphone 125 with headsets 119 and 120, respectively.

During the introductory phase of the person to person communication, wherein the simultaneous interpreter explains procedures to both parties, the LISTEN TO switch should be set to BOTH, and pushbutton 163a should be depressed. Thereafter, switch 162 may remain in the BOTH position, so that the simultaneous interpreter hears everything that is spoken by either party. However, if this produces excessive noise, as for instance doctor instructions to a nurse or other staff, or excessive patient noise, the simultaneous interpreter may wish to move switch 162 back and forth between the DOCTOR and PATIENT positions, as needed. If this procedure becomes necessary, it may also be desirable to latch switch 162 to pushbuttons 163b and 163c so that only a single switching operation is necessary to allow the simultaneous interpreter to route incoming and outgoing signals to the correct audio lines.

However, under normal conditions, the switch 162 will remain in the BOTH position. On the other hand, the simultaneous interpreter must depress pushbuttons 163b and 163c during the course of a conversation to route the interpreted signals to the correct listener. If either pushbutton 163b or 163c is depressed, the interpreter hears in one language and interprets into the other, while both the doctor and the patient and speak and hear only in a single language. If desired, the system 110 can be adapted to provide a background audio signal of the speaker at a reduced volume level, thereby to assist the doctor and patient in determining when the other is beginning and ending speech, and adding a realistic effect.

Figure 13:
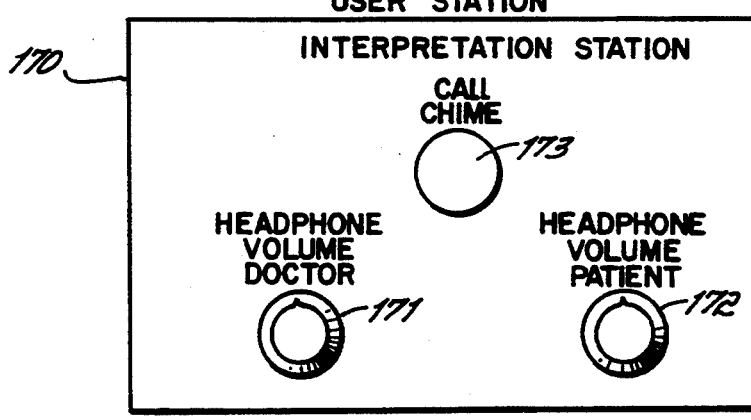

FIG. 13 shows a preferred embodiment of a control panel 170 located at User station 111. More particularly, FIG. 13 shows a volume control knob 171 for setting the volume of signals received by first headset 119 and a volume control knob 172 for signals received by the patient on second headset 120. The user station 111 further includes a call pushbutton 173, which produces an audio sound, preferably a "chime" at a speaker 174 located at the control panel 160 of the simultaneous interpreter station 122. This indicates that simultaneous interpretation is needed. If desired, the pushbutton 172 may also be used by the doctor and patient to indicate when speech is completed, and that a response is expected.

The control panel 170 would be suitable for the embodiments shown in FIGS. 8 and 9. For the embodiments shown in FIGS. 10 and 11, each of portions 112 and 113 would be provided with separate volume controls and CALL chimes.

FIGS. 14 and 15 are truth tables which illustrate routing of voiced signals between the user station 111 and the simultaneous interpreter station 122.

While several variations of a preferred embodiment of the invention have been described, it is to be understood that the invention is not limited thereby and that in light of the present disclosure, various other alternative embodiments will be apparent to a person skilled in the art. Accordingly, it is to be understood that changes may be made without departing from the scope of the invention as particularly set forth and claimed.

I claim:

1. A remote simultaneous interpretation system comprising:
   at least one user station, the user station having a first portion for interacting with a first person and a second portion for interacting with a second person, each of the portions including an acoustical speaker and a microphone;
   a simultaneous interpreter station for interacting with an interpreter and having an acoustical speaker and a microphone;

means for operatively linking the interpreter station and the user station to provide two way audio communication between said simultaneous interpreter station and each of said first and second portions; and the simultaneous interpret station further including, a first listening switch means operatively connected to the acoustical speaker at the interpreter station and having, at least three positions of operation to selectively receive voiced audio signals from one of the following: the first portion microphone, the second portion microphone, and both the first portion microphone and the second portion microphone, and a second speaking switch means operatively connected to the microphone at the interpreter station and having at least three positions of operation to selectively convey voiced signals from the interpreter at the interpreter station to one of the following: the first portion acoustical speaker, the second portion acoustical speaker, and both the first portion acoustical speaker and the second portion acoustical speaker, each of the first and second switch means being selectively switched from the simultaneous interpreter station and not from the first and second portions, the first and second switch means configured so that when the interpreter at the interpreting station is listening to first voiced audio signals from the first portion microphone and simultaneously conveying first interpreted voiced signals to the second portion speaker, the first portion speaker does not receive the first interpreted voiced signals; and when the interpreter at the interpreter station is listening to second voiced audio signals from the second portion microphone and simultaneously conveying second interpreted voiced signals to the first person, the second portion speaker does not receive the second interpreted voiced signals, thereby to provide remote simultaneous interpretation for the first and second persons.

2. The simultaneous interpretation system of claim 1 wherein the operatively linking means comprises a full duplex wire link between the user station and the simultaneous interpreter station.

3. The simultaneous interpretation system of claim 1 wherein the first and second portions of the user station are located remotely from each other and the operatively linking means further includes:

a first linking section for operatively interconnecting the first portion with the interpreter station; and a second linking section for operatively interconnecting the second portion with the interpreter station, at least one of the first and second linking sections comprising a full duplex wireless link.

4. The simultaneous interpretation system of claim 1 and further comprising:

call means selectively operable at the user station to indicate at the interpreter station that simultaneous interpretation is needed.

5. The simultaneous interpretation system of claim 4 wherein said call means further comprises:

a pushbutton located at the user station; and a speaker located at the interpreter station.

6. The simultaneous interpretation system of claim 4 wherein said call means further comprises:

a pushbutton located at the user station; and a speaker located at the interpreter station.

7. The simultaneous interpretation system of claim 1 and further comprising:

indicating means located at the user station and selectively operable by the first and second persons to indicate at the simultaneous interpreter station that communication is complete.

8. The simultaneous interpretation system of claim 1 wherein the simultaneous interpretation station further comprises:

means for routing, at a reduced volume level and during simultaneous interpretation, the voiced audio signals from the first portion microphone to the second portion speaker and the voiced audio signals from the second portion microphone to the first portion speaker.

9. A method for facilitating communication between two persons who do not speak a common language, the method comprising the steps of:

a) conveying, from a first microphone at a first portion of a user station to an acoustical speaker located at a remote simultaneous interpreting station, a first voiced audio signal spoken by a first person, the first voiced audio signal being in a first language;

b) conveying, from a microphone at the remote interpreter station to a second speaker at a second portion of the user station, a voiced interpretation of the first voiced audio signal, the voiced interpretation of the first voiced audio signal being in a second language, and steps a) and b) occurring substantially simultaneously and representing a first mode of operation, the voiced interpretation of the first voiced audio signal not being conveyed to the first speaker of the user station;

c) conveying, from a second microphone at the second portion to the acoustical speaker at the remote simultaneous station, a second voiced audio signal spoken by a second person, the second voiced audio signal being in the second language;

d) conveying, from the microphone at the remote interpretation station to a first speaker at the first portion of the user station, a voiced interpretation of the second voiced signal, the voiced interpretation of the second voiced signal being in the first language, and steps c) and d) occurring substantially simultaneously and representing a second mode of operation, the voiced interpretation of the second voiced audio signal not being conveyed to the second speaker of the user station; and selectively switching, from the remote simultaneous interpreter station, between the first and second modes of operation, thereby to provide simultaneous interpretation for said first and second persons interacting with said first and second portions, respectively.

10. A method of facilitating oral communication between two persons who do not speak a common language:

a) operatively connecting a first and a second person to a remotely located simultaneous interpreter station via first and second audio links;

b) conveying a first voiced signal, in a first language, from said first person to the interpreter station via said first audio link and relaying, in a second language, a voiced interpretation of the first voiced signal to said second person via said second audio link, the voiced interpretation of the first voiced signal not being conveyed to the first person via the first audio link; and c) conveying a second voiced signal, in the second language, from the second person to the interpreter station via the second audio link and relaying, in the first language, a voiced interpretation of the second voiced signal to said first person via said first audio link, the voiced interpretation of the second voiced signal not being conveyed to the second person via the second audio link, thereby to provide remote simultaneous interpretation between said first and second persons using said first and second audio links, respectively.

11. The method of claim 10 and further comprising the step of:

selectively switching between steps b) and c), said switching occurring from said simultaneous interpreter station.

* * * * *